United States Patent
Rodermund et al.

(10) Patent No.: US 9,401,842 B2
(45) Date of Patent: Jul. 26, 2016

(54) METHOD AND DEVICE FOR CONFIGURING TERMINAL DEVICES

(75) Inventors: Friedhelm Rodermund, Koblenz (DE); Thomas Hying, Düsseldorf (DE)

(73) Assignee: VODAFONE HOLDING GMBH, Dusseldorf (DE)

( * ) Notice: Subject to any disclaimer, the term of this patent is extended or adjusted under 35 U.S.C. 154(b) by 739 days.

(21) Appl. No.: 13/560,107

(22) Filed: Jul. 27, 2012

(65) Prior Publication Data

US 2013/0041988 A1    Feb. 14, 2013

(30) Foreign Application Priority Data

Aug. 5, 2011    (DE) .......................... 10 2011 080 538

(51) Int. Cl.
| | | |
|---|---|---|
| *G06F 15/177* | (2006.01) | |
| *H04L 12/24* | (2006.01) | |
| *H04L 29/08* | (2006.01) | |

(52) U.S. Cl.
CPC ........ *H04L 41/0806* (2013.01); *H04L 41/0213* (2013.01); *H04L 41/0233* (2013.01); *H04L 67/125* (2013.01); *H04L 67/34* (2013.01)

(58) Field of Classification Search
CPC .......................... H04L 41/046; H04L 41/0806
See application file for complete search history.

(56) References Cited

U.S. PATENT DOCUMENTS

| | | | | |
|---|---|---|---|---|
| 8,688,144 B1 * | 4/2014 | Alexander | ........ | H04M 1/72572 455/456.1 |
| 2008/0281956 A1 * | 11/2008 | Madej | ................. | H04L 41/0226 709/223 |
| 2009/0040947 A1 * | 2/2009 | Krivopaltsev | ................. | 370/255 |

* cited by examiner

*Primary Examiner* — Brian P Whipple
*Assistant Examiner* — Gregory P Tolchinsky
(74) *Attorney, Agent, or Firm* — International IP Law Group, PLLC (57) ABSTRACT

A method for configuring terminal devices is provided. The method includes sending a first message containing parameter values to a first terminal. The first terminal includes a data structure containing designations for each parameter value. The method includes storing, in response to receiving the first message, the parameter values in associated elements of the data structure. The method includes reading the data structure. The method includes determining the associated elements by determining the associated designations of the associated elements; or, comparing the data structure and an initial data structure before sending the first message. The first terminal contains the initial data structure. The method includes generating a second message including instructions for storing a parameter value in a second terminal. The instructions are generated as a result of evaluating the data structure. The instructions include the determined associated designations. The method includes sending the second message to the second terminal.

14 Claims, 2 Drawing Sheets

Fig. 1

METHOD AND DEVICE FOR CONFIGURING TERMINAL DEVICES

CROSS-REFERENCE TO RELATED APPLICATION

This application claims priority to German (DE) Patent Application No. DE 102011080538.9, filed on Aug. 5, 2011, the contents of which are incorporated by reference as if set forth in their entirety herein.

BACKGROUND

Electronic, processor-based terminal devices, mobile terminal devices, such as, mobile phones, smartphones, notebook computers and the like first are configured to perform various tasks and make use of services. Services that use preceding configurations include, for example, services for message transmission such as, e-mail or the Multimedia Messaging Service that are provided in a cellular network or other communication network. During configuration, programs are installed in the terminal devices and parameters are stored that serve to execute programs and to use services. In mobile terminal devices, these parameters are generally adapted to the home cellular network in which the terminal device is to be operated. This is why the configuration is normally carried out by the operator of the cellular network.

Configuration parameters are usually stored in a specific data structure in the terminal devices. The data structure has elements that contain the value of the parameters and to which a designation is assigned for identifying the associated parameters. An example of such a data structure is a tree structure of the type provided, for example, for terminal device management corresponding to the Open Mobile Alliance (OMA) Device Management (OMA DM) specified by the OMA, which is being used more and more often in mobile terminal devices. The elements of the tree structure correspond to the nodes of the tree to which a designation has been assigned, and which can contain a parameter value (a node may not contain a parameter value; for example, internal nodes of the tree structure can also be unfilled, serving only as a connection point from the node's child nodes to the tree structure).

The parts of the data structure in which the configuration parameters are stored in a terminal device, each configuration parameter relating to the configuration of a specific application or of a specific service, typically include a number of individual elements. Some of these elements are defined so as to attempt to encompass as many device types and manufacturers as possible, although some elements are defined for specific manufacturers or specific device types. The elements can already be incorporated into the data structure at the time when the terminal device is manufactured. However, at least some elements are augmented at the time of the configuration. Here, different elements are augmented during the configuration of the terminal devices of different manufacturers or of different types.

Consequently, knowledge of the specific data structure that the terminal device contains for purposes of storing the configuration parameters is used to perform adaptations to the configuration parameters of a terminal device of a specific device type on the basis of instructions for the possible generation of the relevant elements of the data structure, and for the storage of parameter values in the elements of the data structure provided for this purpose. An adaptation of configuration data on the basis of such instructions can be performed, for example, by the OMA DM. One problem, however, lies in the fact that the precise data structure for storing the configuration data of a terminal device is often not precisely known. Therefore, before configuration data of a terminal device can be changed, typically, the data structure is made available by the manufacturer of the terminal device.

Other known configuration methods can be carried out without precise knowledge of the configuration data structure of the terminal device that is to be configured. With this method, configuration parameters for certain services or applications are transferred to the terminal device in a predefined format or with predefined parameter designations for the first-time configuration, and a configuration mechanism implemented in the terminal device ensures that the configuration parameters are stored in the elements of the data structure intended for this purpose. An example of such a configuration method is OMA Client Provisioning (OMA CP), which has likewise been specified by the OMA.

Older configuration procedures such as OMA CP, however, often have a number of drawbacks. With OMA CP, one of these drawbacks is that it provides only a one-way transmission of messages from a configuration server to the terminal device that is to be configured, and the terminal device cannot send messages to the configuration server. As a result, the terminal device cannot supply feedback about the successful completion of the configuration, which is possible with the newer methods, such as the OMA DM. Moreover, OMA CP does not allow any configuration that can be carried out without interaction with the user of the terminal device. Moreover, the scope of the functions of OMA CP is much smaller than that of OMA DM. For instance, OMA CP cannot perform functions such as firmware updates, the installation of applications such as various diagnostic functions relating to terminal device parameters such as battery level, network coverage, etc., and an expansion of the scope of the functions is no longer planned.

Consequently, among other things, for the reasons mentioned above, a configuration by the OMA DM may be used, although it entails the described problem that the data structure for storing the configuration data is often not known.

SUMMARY

The subject innovation relates to the configuration of terminal devices, mobile terminal devices. The subject innovation also relates to a method and systems for configuring terminal devices.

According to a first aspect of the subject innovation, a method for configuring terminal devices is created. With this method, values of parameters are stored in the terminal devices within a data structure that, in each case, contains an element with an associated designation for a parameter. The method includes: (i) a first configuration message is transmitted to a first terminal device, whereby the configuration message contains parameter values, and, in response to the receipt of the configuration message, the parameter values are stored in the associated elements of the data structure stored in the first terminal device, (ii) the data structure containing the parameter values is read out of the first terminal device, (iii) the read-out data structure is evaluated in the server, whereby the evaluation includes a determination of the elements of the read-out data structure in which the parameter values have been stored, and it includes a determination of the designations of these elements or a comparison between the read-out data structure and another initial data structure that was read out of the terminal device before the transmission of the first configuration message, (iv) a second configuration message with instructions for storing at least one of the parameter values in a second terminal device is generated, whereby the instructions are generated as a function of the result of the evaluation and they contain the determined designation of the element in which the parameter value is stored, and (v) the second configuration message is transmitted to the second terminal device.

According to another aspect of the subject innovation, a computer system for configuring terminal devices is provided, such as a server. The server stores values of parameters in the terminal devices within a data structure that contains an element with an associated designation for each parameter. The server is configured in such a way that (i) a first configuration message is transmitted to a first terminal device, whereby the configuration message contains parameter values, and, in response to the receipt of the configuration message, the parameter values are stored in the associated elements of the data structure stored in the first terminal device, (ii) the data structure containing the parameter values is read out of the first terminal device, (iii) the read-out data structure is evaluated, whereby the evaluation includes a determination of the elements of the read-out data structure in which the parameter values have been stored, and it includes a determination of the designations of these elements or a comparison between the read-out data structure and another initial data structure that was read out of the terminal device before the transmission of the first configuration message, (iv) a second configuration message with instructions for storing at least one of the parameter values in a second terminal device is generated, whereby the instructions are generated as a function of the result of the evaluation, and they contain the determined designation of the element in which the parameter value is stored, and (v) the second configuration message is transmitted to the second terminal device.

On the basis of an evaluation of a data structure read out of the terminal device, the method or the server determines the elements of the data structure in which specific configuration parameters are to be stored. Through a determination of the elements of the read-out data structure in which specific configuration parameters have been stored, it is possible to determine the designations of the elements. A comparison between the read-out data structure containing the parameter values and the initial data structure allows a determination of the elements to be augmented in the initial data structure in order to store the parameter values in the terminal device.

The parameter values are first stored in the first terminal device on the basis of the first configuration message. A second configuration message is used to configure the second terminal device. One embodiment of the method and of the server provides that the first configuration message is of a first type and that the second configuration message is of a second type. In one embodiment of the method and of the server, the first configuration message is evaluated in the terminal device in order to store the parameter values in the terminal device. The first terminal device may have an application that, in response to the receipt of the first configuration message, automatically stores the parameter values in the data structure. In one embodiment of the method and of the server, the first configuration message is a configuration message according to the OMA Client Provisioning specification. Such a configuration message is used for the first configuration (so-called provisioning) of the terminal device and can be evaluated within the terminal device in such a way that the contained parameter values are automatically stored in the configuration data structure.

In one embodiment, the second configuration message that already contains instructions for generating or modifying one or more individual elements is a configuration message according to the above-mentioned OMA DM specification. In this case, the OMA DM message contains the parameters to be configured as well as their values.

The initial data structure is read out of the terminal device in response to a message of the second type, i.e. an OMA DM message, that contains the appropriate commands. In order for an interaction with the terminal device to take place via messages of the second type, an appropriate pre-configuration of the terminal device that enables, for example, information about the configuration server that is sending the messages or authentication data for the configuration to be stored in the terminal device. This preconfiguration is carried out on the basis of a configuration message of the first type. If the initial data structure is read out before the transmission of the above-mentioned first configuration message, then a separate configuration message is sent before the querying of the initial data structure. If the initial data structure is not read out, then the preconfiguration can also be carried out on the basis of the first configuration message.

One embodiment of the method and of the server provides that the second configuration message contains instructions that generate the differences between the read-out data structure and the initial data structure. In this manner, a second terminal device having the initial data structure can be configured in such a way that the parameter values are stored in the elements of the data structure intended for this purpose. The initial data structure can be, for example, the data structure that is present after the terminal device has been manufactured, and it is adapted in order to configure the terminal device so that it can use services or applications. This adaptation can be carried out by the second configuration message. The differences between the read-out data structure containing the parameter values and the initial data structure can be determined by a comparison of these data structures.

Another embodiment of the method and of the server provides that, on the basis of the evaluation of the data structure read out of the first terminal device, at least one device-type-specific configuration profile is drawn up, and the second configuration message is generated on the basis of the configuration profile. The configuration profile can be stored in the server and can thus be used to configure the second terminal devices. Thus, the server generates configuration profiles for the future configuration of terminal devices in a self-learning process, so to speak.

At least a few elements of the data structure in which transmitted parameter values are stored by the server are not present in the initial data structure and are drawn up. Therefore, in one embodiment of the method and of the server, it is provided that the evaluation of the read-out data structure includes a determination of elements of the data structure that are stored in the first terminal device on the basis of the first configuration message. This evaluation, in turn, can be carried out on the basis of the comparison to the initial data structure. A related embodiment of the method and of the server is characterized in that the second configuration message contains instructions for placing the determined elements within the data structure in the second terminal device. Within the first terminal device, these elements are automatically generated by the application of the terminal device in response to the receipt of the first configuration message.

Another embodiment of the method and of the server includes that the first configuration message contains parameter values relating to a client of the terminal device and a first evaluation of the read-out data structure is first carried out for this client, it includes that another configuration message containing parameter values relating to an additional client of the terminal device is sent and another evaluation of another read-out data structure relating to the additional client is carried out, and it includes that the instructions in the second configuration message are generated as a function of the first evaluation and of the additional evaluation. The first and the additional configuration messages may both be messages of the first type. Clients of the terminal device include applications or functions for access to services such as e-mail, Multimedia Messaging Service (MMS), and Internet browsing. In each case, one client of the terminal device is associated with one service. Owing to the individual configuration and evaluation of different clients of the terminal device, it is possible to resolve ambiguities that can arise when the same parameter values (optionally with different designations) are entered into different parts of the configuration data structure, which are each associated with one client.

A refinement of the method and of the server provides that the data structure includes a tree with several levels whose elements are nodes that each contain a parameter value or that are each connected to another node of a lower level. The nodes that are connected to other nodes of a lower level are also referred to as internal nodes if they are not the so-called root of the tree. Nodes that are not connected to other nodes of the tree in a lower level are also referred to as leaf nodes. In one embodiment, the parameter values are stored in the leaf nodes whereas the internal nodes are provided in order to group the connected nodes of the lower levels. Fundamentally, however, parameter values can also be stored in internal nodes.

Typically, the configuration data structures, as explained above, are device-specific. Consequently, only instructions for the configuration of a second terminal device of the same type as the first terminal device can be determined on the basis of the evaluation of the data structure read out of a specific first terminal device. Thus, in one embodiment of the method and of the server, the first and the second terminal devices are terminal devices of precisely one type.

Another embodiment of the method and of the server provides that the first or the second configuration messages are sent via a cellular network. This allows a simple configuration of mobile terminal devices.

Aside from the method and the server, a computer program with a software code is provided that is adapted in such a way that it can execute a method according to one of the preceding claims on a processor when it is executed on a data processing installation. Moreover, a system comprising a server of the type described here as well as the first or second terminal device are likewise the subject matter of the subject innovation.

The above-mentioned as well as other advantages, special features and practical refinements of the subject innovation are also explained on the basis of the embodiments that are described below with reference to the figures.

DETAILED DESCRIPTION OF SPECIFIC EMBODIMENTS

The embodiments of the subject innovation explained below by way of an example relate to the configuration of mobile terminal devices 101 such as mobile phones, smartphones, notebook computers and the like by a cellular service provider in whose cellular network 102 the terminal devices 101 are used in order to utilize services provided in the cellular network 102. In order to configure terminal devices of a certain device model, the model-specific data structure for storing configuration data is determined for at least one terminal device 101. Such a terminal device 101 that is connected to the cellular network 102 is shown by way of an example in the schematic depiction of FIG. 1. Once the cellular service provider knows the configuration data structure of the terminal device 101 shown, the cellular service provider can configure additional terminal devices 101 of the same model.

Figure 1:
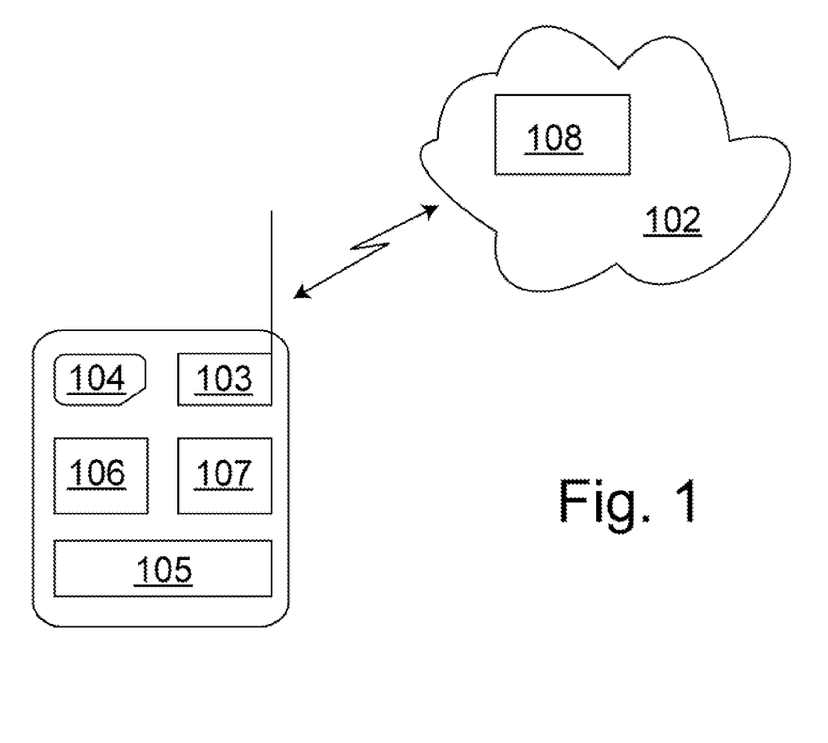
FIG. 1 is a schematic depiction of a terminal device that is connected to a communication network configured as a cellular network in which a configuration server is present.

The terminal device 101 shown in FIG. 1 includes a radio module 103 with which radio connections can be established between the terminal device 101 and radio components (not shown here) of the cellular network 102, as a result of which the terminal device 101 can access the services provided via the cellular network 102. The radio module 103 is adapted to the radio technology of the cellular network 102 which can be, for instance, a GSM (Global System for Mobile Communications) or a UMTS (Universal Mobile Telecommunications System) cellular network. Aside from services for voice communication, services provided by the cellular network 102 include, for example, cellular services for data access to the Internet or other computer networks, message services, such as, SMS (Short Message Service), MMS (Multimedia Messaging Service) and e-mail. One client of the terminal device 101 may be associated with each service, and this client can include one or more software programs for utilizing the service. As will be explained below, the individual clients of the terminal device 101 can be configured separately.

For purposes of access to the cellular network 102, a subscriber identification module 104 is also provided in the terminal device 101. The subscriber identification module 104 makes information and processes available in the cellular network 102 for the identification and authentication of a cellular user or of a cellular subscription, for instance, an identifier that is unambiguously associated with the subscription as well as an encryption algorithm used for the authentication, and said subscriber identification module 104 also contains data and processes for controlling access by the terminal device 101 to the cellular network 102. In one embodiment, the subscriber identification module is contained in a chip card that can be inserted into a card reader (not shown in the figure) of the terminal device 101 in order to be connected to the terminal device 101. By the same token, however, the subscriber identification module 104 can also be configured differently. If the terminal device 101 is used in a GSM or UMTS cellular network, the subscriber identification module 104 is configured as a SIM (Subscriber Identification Module) or USIM (Universal SIM).

For interaction with the user, the terminal device 101 has a user interface 105 for capturing user input, and to output information to the user. The inputs can be provided by, for example, a keypad, a joystick or a touchscreen as well as a microphone for entering acoustic information. The outputs can be provided by, for instance, a display for visually showing information to the user as well as an interface such as, for example, a loudspeaker or headphones or a headphone jack to output audio information.

Moreover, the terminal device 101 includes at least one processor 106 for controlling functions of the terminal device 101 and of its components as well as for executing programs that can be installed in the terminal device 101. The processor 106 is coupled to a memory unit 107 that stores the software code for executing the control functions and the software code of applications installed in the terminal device 101. Moreover, user data, for example, the received and sent messages used in the terminal device, multimedia files such as audio or video files, is stored in the memory unit 107.

The memory unit 107 also contains configuration data with which the configuration of the terminal device 101 is defined. The configuration data contains configuration parameters for access by the terminal device 101 to services of the cellular network 102 or for executing application programs in the terminal device 101. Additional configuration parameters for access to the cellular network 102 can be stored in the subscriber identification module 104. In the embodiment described here, however, the configuration parameters stored in the subscriber identification module 104 are not taken into consideration.

The configuration parameters are each stored in the memory unit 107 under a designation associated with them. With this designation the configuration parameters can be addressed by applications executed in the processor 106 or by control software executed in the processor and can read them out of the control unit. The manufacturer of the terminal device 101, for example, can store the designations in the terminal device 101 at the time when it is manufactured. Fundamentally, all of the configuration parameters can be stored in a table or in a similar data structure on a single hierarchical level. Advantageously, however, it is provided that the configuration parameters are stored in a hierarchical data structure. In one embodiment, this data structure is a tree structure. A concrete embodiment provides that the data structure is configured as a tree structure according to the OMA DM specification.

Figure 2:
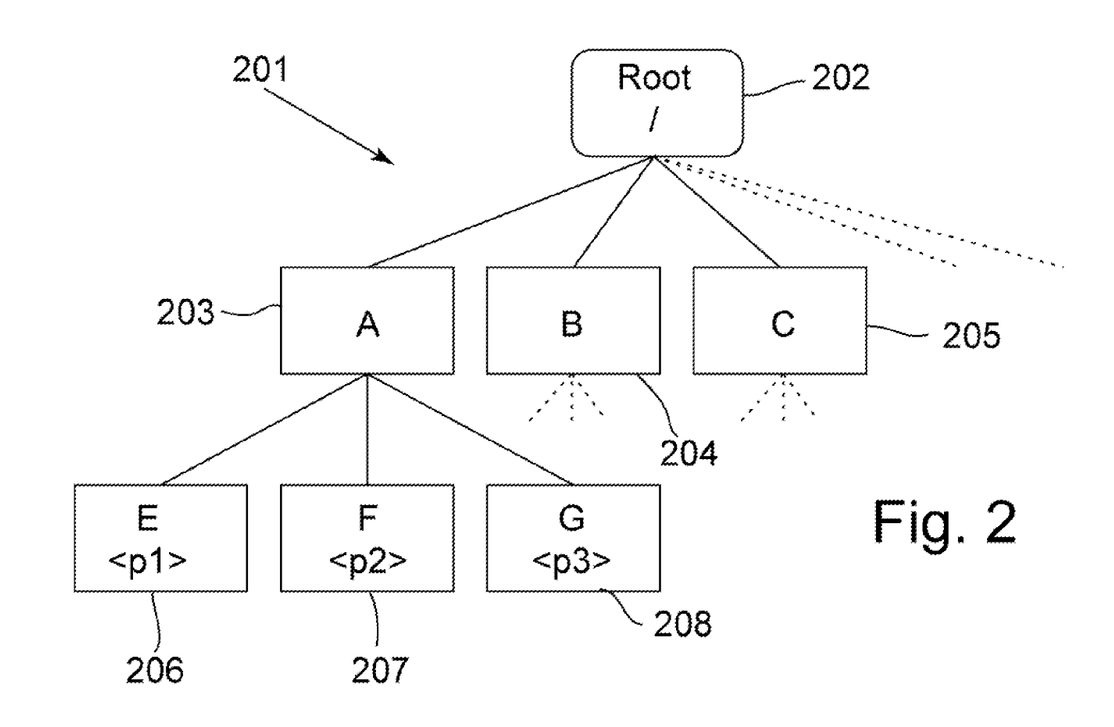
FIG. 2 is a schematic depiction of parts of a data structure configured as a tree structure for storing configuration data in the terminal device.

A section of a tree structure 201 that can be used to store the configuration parameters is shown schematically in FIG. 2. The tree structure 201 is hierarchically set up in several levels and has a root 202 ("root", "/") from which the tree structure 201 branches off. Here, the root 202 and additional nodes of the tree can each be associated with one or more child nodes. The child nodes are each arranged on the next-lower level of the tree. A node with which at least one child node is associated is referred to as an "internal node" of the tree structure 201. A node with which no child nodes are associated is also called a leaf node. In the tree structure 201 shown by way of an example in FIG. 2, nodes 203-205 are internal nodes and nodes 206-208 are leaf nodes.

Each node has a designation associated with it that can be provided in order to address the node. The nodes shown by way of an example in FIG. 2 have the designations "A"-"G". During the addressing procedure, it is advantageous to indicate the path through the tree, that is to say, the node that is to be addressed, as well as all nodes that are passed, starting from the root 202, in order to reach the node that is to be addressed. The addressing of the node 208 in these instructions is "/A/G".

Fundamentally, one configuration parameter value can be stored in each node of the tree. However, it has proven to be advantageous that parameter values are only stored in the leaf nodes of the tree structure. Therefore, in the schematic depiction in FIG. 2, parameter values <p1>, <p2> and <p3> are only stored in the leaf nodes 206-208 with the designations E-G. If it is provided that the storage of parameter values is to take place exclusively in the leaf nodes, internal nodes of the tree structure serve to appropriately group the configuration parameters and, in this manner, to allow a clear configuration of the terminal device 101. The designations that are associated with the internal nodes correspond to the designations of the groups. In this way, groups of configuration parameters can each be associated on several levels with a larger group of configuration parameters, whereby the combination in each level is carried out on the basis of an internal node of the tree structure. In the tree structure shown in FIG. 2 by way of an example, the configuration parameters stored in the leaf nodes 206-208 are combined by the internal node 203 into a group with the designation "A".

The configuration parameters are each combined into a group in the tree structure, said configuration parameters being associated with a client of the terminal device 101. This occurs on a specific level of the tree structure, whereby the levels for various clients can differ from each other. Within a group that is associated with a specific client, sub-groups can be created in which configuration parameters that are associated with the client are grouped for the sake of clarity.

The configuration parameters can take on any desired alphanumeric values that are stored in the nodes of the tree structure intended for this purpose. Examples of values that can contain configuration parameters for message services are addresses of servers for network access such as, "web.vodafone.de", identifiers that are used for sending or retrieving messages, the type of retrieval of messages (e.g. automatically at predefined time intervals or manually), formats of the messages, the type of connection to the servers (e.g. encrypted or unencrypted), etc. Individual parameter values can appear multiple times within the configuration data structure. It can happen that a certain parameter value is contained in the configuration data of various clients. Thus, for instance, a certain network access can be used by several clients such as, for example, an Internet browsing client and an e-mail client. Since the services used with the terminal device 101 or the associated clients and the associated configuration parameters are generally familiar to the person skilled in the art, the configuration parameters will not be further elaborated upon here.

The configuration data structure of the terminal device 101 can be adapted by external instructions. The adaptations fundamentally include all modifications to the data structure of the configuration data. The possible adaptations include augmenting, removing or renaming nodes of the tree structure. Moreover, configuration parameter values can be stored, changed and deleted in the nodes. The adaptations are undertaken on the basis of instructions in which the node to be adapted is indicated on the basis of its current or future designation. As described above, the path within the tree structure leading to the node that is to be changed or created is indicated. A configuration parameter value that is to be stored in a node for the first time or that is to replace a value that is already stored in the node is likewise indicated in the instructions. In one embodiment, the tree structure can be adapted according to the OMA DM specification and to the associated instructions.

The instructions are transmitted in configuration messages to the terminal device 101. A plurality of instructions for adapting a plurality of nodes of the data structure can be contained in a configuration message. In the embodiment of the configuration system shown in FIG. 1, the configuration messages are sent from a configuration center 108 via the cellular network 103 to the terminal device 101. Fundamentally, any suitable transmission service of the cellular network 102 can be used for this purpose. In one embodiment, the configuration messages are sent to the terminal device 101 as WAP (Wireless Application Protocol) push messages. In additional embodiments, however, message services such as SMS can also be used. In the embodiment shown in FIG. 1, the configuration center 108 is situated in the cellular network 102. In this embodiment, the configuration center 108 can be operated, for example, by the cellular service provider of the cellular network 102. By the same token, however, it is also possible to situate the configuration center 108 outside of the cellular network 102.

In order to allow a remote configuration of the terminal device by configuration messages, by OMA DM messages, the terminal device 101 is first preconfigured in a suitable manner. Here, information about the configuration center 108 as well as authentication data that allows the terminal device 101 to authenticate configuration messages from the configuration center 108 are stored in the terminal device 101. After the preconfiguration, the configuration is fundamentally possible using configuration messages from the configuration center 108.

In order to be able to carry out or change the configuration of the terminal device 101 on the basis of configuration messages, however, it is useful to know the data structure in which the configuration parameters are stored in the terminal device 101. In the tree structure described above for storing the configuration data, it is useful to know the leaf nodes in which configuration parameter values are to be stored, as well as the internal nodes via which the path leading to the leaf nodes runs. If configuration parameter values already stored in the terminal device 101 are changed, the configuration center 108 can fundamentally read out and evaluate the data structure stored in the terminal device 101 by a control command to this effect. As a result, the configuration center acquires knowledge about the leaf nodes and internal nodes of the data structure. However, if configuration parameter values are to be stored in the terminal device 101 for the first time, new leaf nodes and internal nodes are generated within the data structure stored in the terminal device 101. The nodes that are generated, however, cannot be determined by an evaluation of the existing data structure. An evaluation is performed, as described in greater detail below, that provides the configuration center with knowledge of the data structure with the internal nodes and leaf nodes that are to be generated. This evaluation is similar to a "self-learning process", in that the evaluation is performed without manual input of the data structure in the configuration center.

Within the scope of the evaluation, the configuration center draws up one or more terminal-device-specific configuration profiles that can be consulted for the future configuration of terminal devices of the same type. The creation of several configuration profiles makes it possible to draw up individual configuration profiles for various clients of the terminal device, whereby each individual configuration profile is intended for one client. The configuration profiles indicate how an initial configuration of a terminal device 101 has to be adapted during the configuration using appropriate instructions. It is indicated which existing nodes of the configuration data structure are to be filled anew with configuration parameter values or else manipulated (change of a previously stored value) and which new nodes of the configuration data are generated. The initial configuration can be the configuration that is present after the manufacturer has produced or delivered the terminal device 101. This initial configuration can be adapted by the configuration center 108 of the cellular service provider or by another entity in order to allow use of cellular services in the cellular network 102 or use of applications that the cellular service provider or the other entity has installed in the terminal device 101.

The evaluation is based on a first configuration of the terminal device 101, which is also referred to here as provisioning and which is likewise carried out by the configuration center. Within the scope of the provisioning, the relevant configuration parameters or their values are stored in the terminal device 101 for the first time. In order to carry out the provisioning for purposes of evaluating or determining the configuration data structure, the provisioning is not carried out on the basis of the previously explained instructions for adapting individual nodes of the data structure. The provisioning is not carried out by the OMA DM. A special provisioning mechanism is used for provisioning purposes. This can be the OMA CP mechanism that is generally known and that is specified by the OMA.

Within the scope of the provisioning of the terminal device 101, a configuration message, which is also referred to here as a provisioning message, is sent to the terminal device 101. The provisioning message contains the values of the configuration parameters that are to be stored in the terminal device 101 within the configuration data structure. The configuration parameter values are indicated in the provisioning message in a predefined format and with predefined designations. The designations of the configuration parameters that are to be indicated in the provisioning message are standardized, as is the case, for example, with the above-mentioned OMA CP mechanism, and they may not correspond to the designations that correspond to the nodes of the data structure where the configuration parameter values are stored in the terminal device 101. Moreover, it can be provided that the provisioning message merely contains the parameter values with the predefined designations that are to be stored in the terminal device 101, but no information pertaining to the internal nodes of the configuration data structure or to the paths under which the configuration parameter values are stored in the data structure.

The provisioning message is generated in the configuration center 108 and likewise sent to the terminal device 101 via the cellular network 102. A suitable data transmission service can be used for this purpose. In one embodiment, the provisioning message is sent to the terminal device 101 via SMS. However, other data transmission services can be used such as WAP push. The provisioning message has a special format that is recognized in the terminal device 101. On the basis of the format, the provisioning message is transferred to a provisioning application within the terminal device 101. This is done transparently, that is to say, not visibly to the user of the terminal device 101. The provisioning application is already installed in the terminal device 101 at the time when the device is manufactured.

The provisioning application of the terminal device 101 evaluates the received provisioning message and stores the received configuration parameter values in the configuration data structure of the terminal device 101. In this process, the provisioning application also generates any nodes that were not previously present in the data structure—internal nodes as well as leaf nodes. A logic for the evaluation of the provisioning message and for the implementation in a corresponding adaptation of the configuration data structure is implemented in the provisioning application. This logic uses the designations of the configuration parameters that are standardized and that are also contained in the provisioning message in order to enter these configuration parameters into the configuration data structure. Here, the provisioning application is also able to store a configuration parameter under a different designation in a specific node of the configuration data structure. In this manner, the configuration parameters can be stored in the data structure under manufacturer-specific designations. Moreover, the provisioning application is able to generate leaf nodes as well as internal nodes of the configuration data structure if, for example, a node that is provided within the path of the configuration parameter is not already contained in the configuration data structure.

After the provisioning message has been evaluated by the provisioning application and after the configuration parameter values contained in the provisioning message have been stored in the configuration data structure of the terminal device 101, the configuration data structure with the requisite nodes is present in the terminal device 101. This data structure containing the requisite nodes is used in the evaluation by the configuration center 108.

In order to carry out the evaluation, a terminal device is used that is first present in the initial configuration. As explained above, it can be a terminal device 101 in the state in which it is delivered by the manufacturer. It is provided that the configuration center 108 reads out the configuration data structure of this terminal device 101 using a control command sent to the terminal device 101, before the provisioning message is sent to the terminal device 101. The configuration data structure read out in this process corresponds to the initial configuration data structure used as the basis by the configuration center 108 and it is stored in the configuration center 108. In order to read out the initial configuration, an OMA DM control command is used with which the configuration data structure can be read out ("tree discovery").

In order to make it possible to read out the initial configuration, the preconfiguration of the terminal device 101 is carried out first. In one embodiment, the preconfiguration, in turn, is carried out by the OMA CP mechanism, whereby a message for the preconfiguration is sent to the terminal device 101. The message is sent separately, before the provisioning message is sent, and the initial configuration data structure is read out. In response to the receipt of the message, the parameters for the pre-configuration are stored in the terminal device 101. This process makes use of the fact that the storage by the OMA CP mechanism can take place without additional information about the configuration data structure of the terminal device 101. The storage of the preconfiguration can include an interaction with the user of the terminal device 101 in which the user, for example, fundamentally gives permission for a remote configuration by the OMA DM mechanism.

After the initial configuration data structure has been read out of the terminal device, the configuration center 108 sends the above-mentioned provisioning message to the terminal device 101. The configuration parameter values contained there are likewise stored in the configuration center 108. The provisioning message is evaluated and processed within the terminal device 101 in the above-mentioned manner so that the configuration data structure of the terminal device 101 can be appropriately adapted and, in the process, the configuration parameter values that are contained in the provisioning message can be stored in the configuration data structure. Once again, this can involve user interaction in which the user gives permission for the installation of the parameters.

Once a predefined period of time has passed after the transmission of the provisioning message to the terminal device 101, the configuration center once again reads out the configuration data structure of the terminal device 101 by a control command to this effect that was sent to the terminal device 101. The period of time is selected to be so long that the provisioning application of the terminal device 101 can completely evaluate the provisioning message within this period of time and can carry out the adaptation of the configuration data structure. This ensures that the read-out configuration data structure contains the adaptations that were made on the basis of the provisioning message.

The read-out configuration data structure with the changes made by the provisioning application, which is also referred to below as the desired configuration data structure, is then compared by the configuration center to the previously read-out initial configuration data structure. Within the scope of this comparison, the differences between the desired configuration data structure and the initial data structure are ascertained. These are adaptations that have been made on the basis of the provisioning message.

A configuration profile for the terminal device 101 is drawn up on the basis of the ascertained differences. Based on this configuration profile, configuration messages can then be generated that contain instructions that convert the initial data structure into the desired configuration data structure. These instructions generate the nodes of the desired configuration data structure that are not present in the initial data structure. Further, these instructions may also be used for manipulations of nodes that are already present in the initial data structure. Such manipulations can include changing a parameter value that is stored in a node.

As explained above, instead of a configuration profile, it is also possible to generate several configuration profiles that each relate to the configuration of a client. Such a configuration profile contains the difference between the desired configuration data structure and the initial data structure relating to the configuration of a given service or a given application. It can be used to generate instructions with which the initial data structure is adapted for purposes of the configuration of the service or of the application. The configuration profiles are ascertained in several steps that each include the configuration on the basis of a provisioning message and the subsequent reading out as well as the described evaluation of the changed configuration data structure. In each step, the evaluation is carried out for a client of the terminal device 101.

After the configuration profiles described above have been generated, they can be used by the configuration center in order to carry out the first configuration of terminal devices of the same type as the terminal device used for the evaluation, that is to say, the provisioning of these terminal devices, by configuration messages to this effect. The configuration messages contain instructions for adapting the initial data structure, comprising instructions for the generation of the nodes not yet present, and for the adaptation of nodes that are already present in the initial data structure.

During the evaluation of the read-out configuration data structure and in order to generate the configuration profiles, the configuration center 108 determines within the read-out desired configuration data structure the designations of the nodes in which the configuration parameter values contained in the provisioning message are stored within the desired configuration data structure. In this manner, the configuration center 108 ascertains the nodes along with their terminal-device-specific designations and the associated paths for individual configuration parameters.

The node designations ascertained in this manner are stored along with the path in the configuration center 108 and can be used in the future to generate configuration messages with instructions for the systematic adaptation of individual nodes in order to store or change individual configuration parameters. In this manner, individual configuration parameters can be systematically stored or adapted in terminal devices 101 of the same type as the terminal device 101 used for the evaluation. By the same token, the configuration center 108 can systematically read out individual parameters out of a terminal device 101. These capabilities of the configuration center can be used, for example, to remedy errors or to adapt individual parameters at a later point in time, after the first configuration of a terminal device 101.

The evaluation described above can fundamentally be carried out in the configuration center 108, independently of the comparison between the read-out desired configuration data structure and the initial data structure. On the basis of this comparison, however, nodes can be ascertained that were not present in the initial configuration and that were augmented by the terminal device, and the designation of these nodes as well as their position within the configuration data structure can be determined. These are internal nodes or leaf nodes that are contained in the augmented configuration data structure but not in the initial data structure. Instructions for the augmentation of the added nodes that were ascertained on the basis of the comparison are incorporated into the configuration profiles so that they can be applied in the future during the configuration of terminal devices of the same type.

As explained above, the evaluation that ascertains the parameter designations and that determines the nodes that are augmented is carried out in several steps for each client of the terminal device 101, whereby in each step, the configuration profile of the client in question is determined. In this manner, ambiguities can be resolved or avoided, which can arise in that a parameter value is taken into account in the configuration of several clients (if applicable with a different designation).

A total configuration for the terminal device 101 can be drawn up from the configuration profiles of the individual clients, and this total configuration can be used in the future for the configuration of terminal devices 101 of the same type.

Although the subject innovation has been described in detail in the drawings and in the presentation given above, the presentations are merely illustrative and provided by way of example, and should not be construed in a limiting manner. The subject innovation is not limited to the embodiments explained. The person skilled in the art can glean additional variants of the subject innovation and their execution from the preceding disclosure, from the figures and from the patent claims.

In the patent claims, terms such as "encompass", "include", "contain", "have" and the like do not exclude additional elements or steps. The use of the indefinite article does not preclude the plural. Each individual device can execute the functions of several of the units or devices cited in the patent claims. The reference numerals indicated in the patent claims are not to be construed as a limitation of the steps employed.

What is claimed is:

1. A method for configuring terminal devices, comprising:
   sending a first configuration message comprising a plurality of parameter values to a first terminal device, wherein the first terminal device includes a data structure comprising, for each of the parameter values, an associated designation, wherein the first configuration message is a configuration message according to the Open Mobile Alliance (OMA) Client Provisioning Specification which is arranged such that storage of the parameter values can take place in the first terminal device without additional information about the data structure of the first terminal device;
   automatically storing in the first terminal device, by an application included in the first terminal device, in response to receiving the first configuration message, the parameter values in associated elements of the data structure;
   reading the data structure containing the parameter values out of the first terminal device after storing the parameter values in associated elements of the data structure by the application;
   evaluating the read-out data structure of the first terminal device in a server to determine the associated elements by:
   determining the associated designations of the associated elements; or
   comparing the read-out data structure and an initial data structure before sending the first configuration message, wherein the first terminal device includes the initial data structure;
   generating a second configuration message comprising instructions for storing at least one of the parameter values in a second terminal device, wherein the instructions are generated as a result of evaluating the read-out data structure of the first terminal device, and wherein the instructions include the determined associated designations of the associated elements; and
   sending the second configuration message to the second terminal device.

2. The method according to claim 1, wherein the first configuration message includes a first type of configuration messages, and wherein the second configuration message includes a second type of configuration messages.

3. The method according to claim 1, wherein the second configuration message contains instructions to generate differences between the read-out data structure and the initial data structure.

4. The method according to claim 1, comprising drawing up at least one device-type-specific configuration profile based on evaluating the read-out data structure, wherein the second configuration message is generated based on the device-type-specific configuration profile.

5. The method according to claim 4, wherein the second configuration message includes instructions for storing the determined associated elements within a data structure in the second terminal device.

6. The method according to claim 1, wherein evaluating the read-out data structure includes determining the associated elements of the data structure based on the first configuration message.

7. The method according to claim 1, comprising:
   evaluating another read-out data structure related to an additional client of the terminal device; and
   sending another configuration message comprising another plurality of parameter values related to the additional client, wherein the plurality of parameter values includes parameter values relating to a first client of the terminal device, and wherein a first evaluation of the read-out data structure is carried out for the first client, and wherein the instructions for storing at least one of the parameter values in a second terminal device are generated as a function of the first evaluation and of the additional evaluation.

8. The method according to claim 1, wherein the data structure includes a tree comprising:
   nodes comprising each of the parameter values.

9. The method according to claim 8, wherein each node is connected to another node.

10. The method according to claim 1, wherein the first terminal device and the second terminal device include one type of terminal device.

11. The method according to claim 1, wherein the first configuration message is sent via a cellular network.

12. The method according to claim 1, wherein the second configuration message is sent via a cellular network.

13. A computer system comprising:
    a processor;
    a memory comprising instructions configured to cause the processor to:
    send a first configuration message comprising a plurality of parameter values to a first terminal device, wherein the first terminal device includes a data structure comprising, for each of the parameter values, an associated designation, wherein the first configuration message is a configuration message according to the Open Mobile Alliance (OMA) Client Provisioning Specification which is arranged such that storage of the parameter values can take place in the first terminal device without additional information about the data structure of the first terminal device;

automatically store in the first terminal device, in response to receiving the first configuration message, the parameter values in associated elements of the data structure;

read the data structure containing the parameter values out of the first terminal device after storing the parameter values in associated elements of the data structure by an application included in the first terminal device;

evaluate the read-out data structure of the first terminal device in a server to determine the associated elements by:
- instructions configured to cause the processor to determine the associated designations of the associated elements; or
- instructions configured to cause the processor to compare the read-out data structure and an initial data structure before the first configuration message is sent, wherein the first terminal device includes the initial data structure;

generate a second configuration message comprising instructions for storing at least one of the parameter values in a second terminal device, wherein the instructions are generated as a result of evaluating the read-out data structure of the first terminal device, and wherein the instructions include the determined associated designations of the associated elements; and send the second configuration message to the second terminal device.

14. A non-transitory computer-readable medium comprising:

computer-executable code configured to cause a processor to send a first configuration message comprising a plurality of parameter values to a first terminal device, wherein the first terminal device includes a data structure comprising, for each of the parameter values, an associated designation, wherein the first configuration message is a configuration message according to the Open Mobile Alliance (OMA) Client Provisioning Specification which is arranged such that storage of the parameter values can take place in the first terminal device without additional information about the data structure of the first terminal device;

computer-executable code configured to cause a processor to automatically store in the first terminal device, in response to receiving the first configuration message, the parameter values in associated elements of the data structure by an application included in the first terminal device;

computer-executable code configured to cause a processor to read the data structure containing the parameter values out of the first terminal device after storing the parameter values in associated elements of the data structure by the application included in the first terminal device;

computer-executable code configured to cause a processor to evaluate the read-out data structure of the first terminal device in a server to determine the associated elements by:
- computer-executable code configured to cause a processor to determine the associated designations of the associated elements; or
- computer-executable code configured to cause a processor to compare the read-out data structure and an initial data structure before the first configuration message is sent, wherein the first terminal device includes the initial data structure;

computer-executable code configured to cause a processor to generate a second configuration message comprising instructions for storing at least one of the parameter values in a second terminal device, wherein the instructions are generated as a result of evaluating the read-out data structure of the first terminal device, and wherein the instructions include the determined associated designations of the associated elements; and computer-executable code configured to cause a processor to send the second configuration message to the second terminal device.

* * * * *